United States Patent [19]

Love

[11] Patent Number: 5,013,202

[45] Date of Patent: May 7, 1991

[54] APPARATUS FOR PICKING UP, TRANSPORTING AND UNROLLING LARGE BALES OF HAY

[76] Inventor: Phillip W. Love, P.O. Box 295, Smithville, Tenn. 37166

[21] Appl. No.: 521,278

[22] Filed: May 8, 1990

[51] Int. Cl.$^5$ .............................. A01D 90/02
[52] U.S. Cl. .................... 414/24.5; 414/436; 414/739; 414/911
[58] Field of Search .............. 414/24.5, 24.6, 434, 414/435, 436, 442, 485, 738, 739, 911; 242/86.5 R, 86.7

[56] References Cited

U.S. PATENT DOCUMENTS

| | | | |
|---|---|---|---|
| 3,880,305 | 4/1975 | Van Polen | 414/24.5 |
| 3,908,846 | 9/1975 | Brummitt | 414/24.5 |
| 4,053,069 | 10/1977 | Love | 414/24.5 |
| 4,082,192 | 4/1978 | Cox | 414/24.6 |
| 4,090,624 | 5/1978 | Krein et al. | 414/24.6 |
| 4,297,065 | 10/1981 | Love | 414/24.5 |
| 4,564,325 | 1/1986 | Ackerman | 414/24.5 |
| 4,579,497 | 4/1986 | Nine | 414/24.5 |
| 4,687,402 | 8/1987 | Zatylny | 414/24.5 |

Primary Examiner—Frank E. Werner
Assistant Examiner—Brian Dinicola
Attorney, Agent, or Firm—Terry M. Crellin

[57] ABSTRACT

An improvement in a self-loading apparatus for picking up and moving a bale of hay having diameters of up to about 3 or 4 feet and longitudinal lengths of up to about 5 or 6 feet. The apparatus is of the type including a main frame member supported on wheels mounted near the end of the main frame. A hitch frame has one end pivotally connected to the front end portion of the main frame, with the other end of the hitch frame adapted for attachment to a tow vehicle. The main frame is adapted to be tilted upwardly about the support wheels when braking devices on the wheels are activated and the tow vehicle is backed up. A pair of load engaging and clamping swing arms are pivotally attached to the respective sides of the main frame. Devices are provided with the main frame and hitch frame for pivotally moving the swing arms away from each other when the main frame is tilted upwardly and, conversely, for pivotally moving the swing arms toward each other when the main frame is lowered by moving the tow vehicle forward while the braking devices on the wheels of the main frame is activated. The improvement of the present invention provides devices for allowing the bale of hay to lie on the ground and be unrolled along the ground by pulling the apparatus forward. Unrolling the bale in such manner provides a long strip of hay for feeding animals.

4 Claims, 4 Drawing Sheets

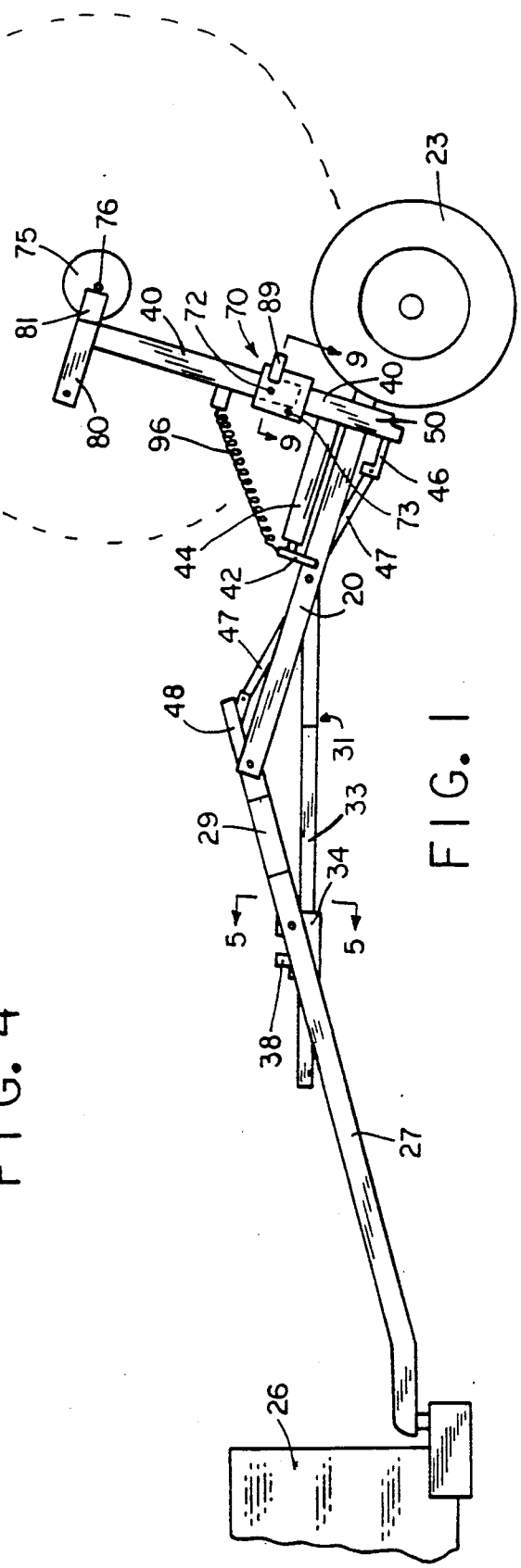
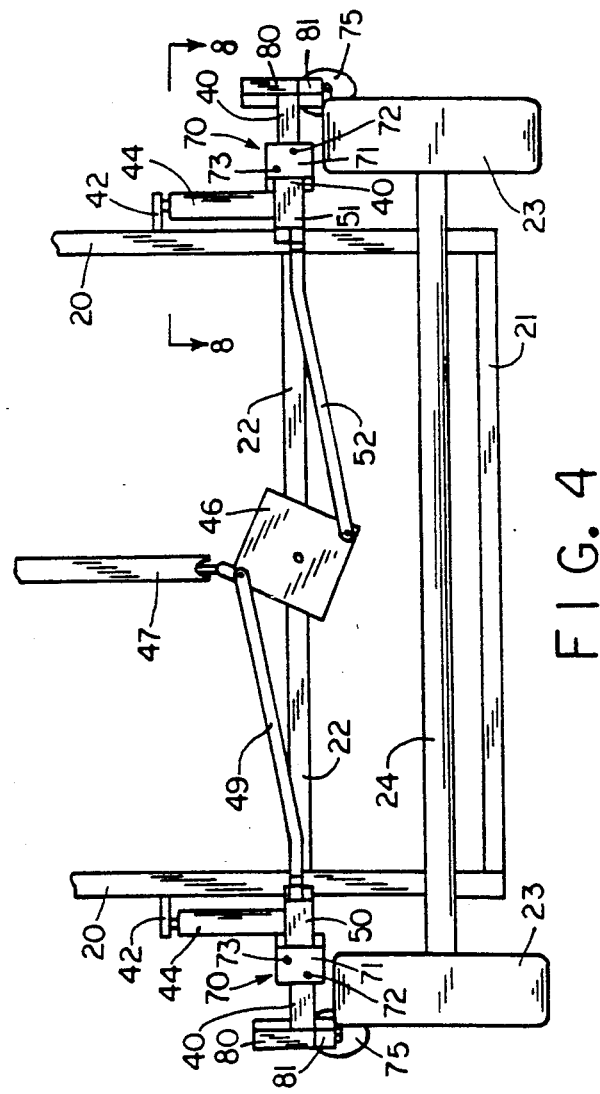
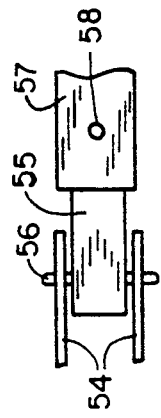

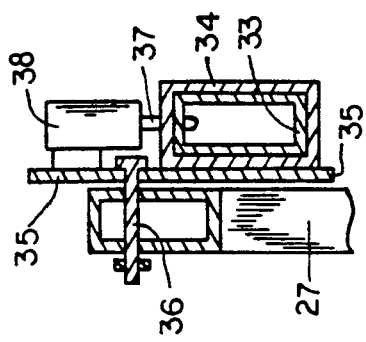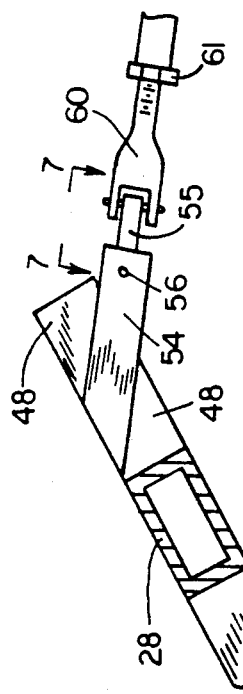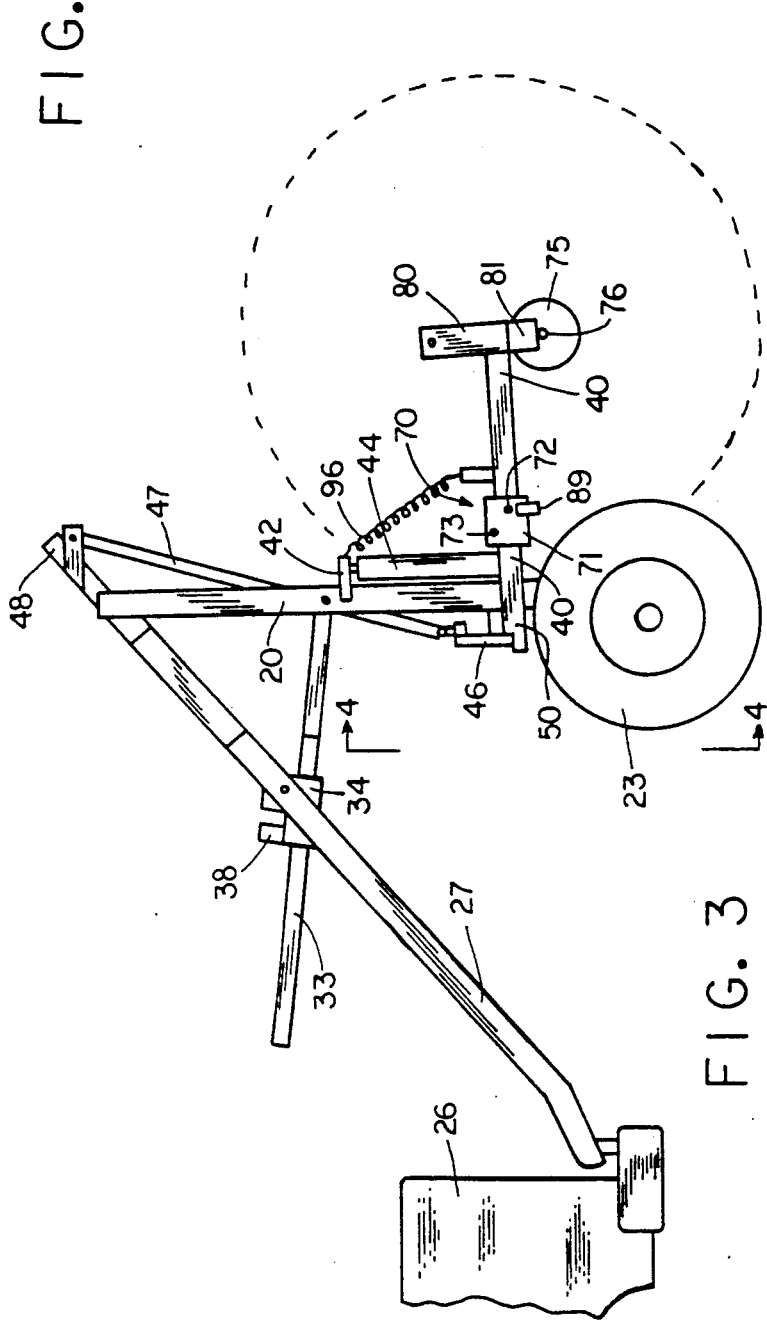

APPARATUS FOR PICKING UP, TRANSPORTING AND UNROLLING LARGE BALES OF HAY

BACKGROUND OF THE INVENTION

1. Field of the Invention

The present invention relates to apparatus and procedures for picking up and transporting large bales of material, such as large cylindrically shaped bales of hay. In particular, the invention provides for an improvement in apparatus whereby the bale of hay can be reclined to lie on the ground as the transporter apparatus moves forward to thereby unroll the bale of hay into a long strip for feeding to animals.

2. State of the Art

Numerous types of apparatus have been proposed and used for handling large bales of material. Generally, the apparatus is used in combination with fork lift trucks or the like, and have been used mainly in warehouses. Representative devices are shown in U.S. Pat. Nos. 3,334,762; 3,876,093; and 3,929,366.

With the recent development of farm equipment for producing large, cylindrical shaped bales of hay, various apparatus have been designed for transporting and handling the large bales of hay. In an earlier patent issued to me, i.e., U.S. Pat. No. 4,297,065, I disclose apparatus having a tilt frame and a pair of rearward extending bale clamping members pivotally attached to the tilt frame. Means were provided for swinging the bale clamping means into engagement with the ends of a bale of hay and then tilting the otherwise vertical tilt frame forward so as to lift the bale of hay from the ground. The teachings of my above-mentioned patent are incorporated herein by reference.

3. Objectives

A principal objective of the present invention is to provide improved apparatus of the type disclosed in my previous patents mentioned above, whereby controlled joints are provided in the bale clamping members which allow the bale of hay to recline and lie on the ground as the apparatus moves forward. The bale of hay is then unrolled in a long strip for feeding to animals.

BRIEF DESCRIPTION OF THE INVENTION

The present invention by provides an improvement in basic apparatus for picking up and moving a large bale of material, such as big bales of hay having dimensions of up to about 4 or 5 feet by 5 or 6 feet. The basic apparatus allows bales to be picked up and moved without requiring the operator of the tow vehicle to get out of or leave the towing vehicle during the lifting and moving operations. The improvement of the present invention provides means for allowing the bale of hay to be lowered to the ground and unroll as the apparatus moves forward. The operator has only to set the bale of hay on the ground and then operate a simple release on a joint in the swing arms of the apparatus. The apparatus is then operated as if the bale was to be lifted and transported, but because the swing arms are not held in a rigid condition, they pivot downwardly to allow the bale of hay to continue to rest on the ground. The apparatus is then moved forward and the bale of hay is unrolled as a long strip of hay across the ground.

The basic apparatus for picking up and moving a bale of hay is of the type comprising a main frame supported by wheel means having a pivot axis transverse of the main frame adjacent to the rear end portion of the main frame; braking means for braking the wheel relative to the main frame; a hitch frame having one end pivotally connected to the front end portion of the main frame, with the other end adapted to be connected to a tow vehicle; and a pair of bale engaging and clamping swing arms pivotally attached to the respective sides of the main frame, each swing arm being adapted to pivot about an axis substantially parallel to the corresponding side of the main frame to which it is attached. In such an apparatus, when the braking means are activated and the tow vehicle is backed up, the front end portion of the main frame swings upwardly, and when the braking means are activated and the tow vehicle moves forward, the front end portion of the main frame swings back downwardly. Means are further associated with the main frame and hitch frame for pivotally moving the outward ends of the swing arms away from each other when the forward end of the main frame is swung upwardly and, conversely, for pivotally moving the outward ends of the swing arms toward each other when the forward end of the main frame moves back downwardly.

In accordance with the present invention, an improvement is provided in such apparatus which comprises a joint in each of said swing arms. Means are provided for locking the joints in each of the swing arms in a rigid condition with the swing arms extending outwardly in a bale lifting position from said main frame. Means are further provided for releasing the joints in each of the swing arms so that the free ends of said swing arms can move to a reclining, bale resting position in which the swing arms extend backwardly from the trailing end of the main frame when the main frame is in its downward position. The bale engagement means allow the bale to be rotated about an axis extending between the engagement means, and the bale engagement means is coupled to the free ends of said swing arms.

A bale can be picked up for transportation in the customary manner when the joints in each of the swing arms are maintained in a rigid position. When the joints are released, the bale can be rested on the ground with the apparatus otherwise being in the transport mode. The apparatus can then be moved forward to unrolled the bale of hay over the ground in a long strip for feeding animals.

Additional objects and features of the invention will become apparent from the following detailed description, taken together with the accompanying drawings.

THE DRAWINGS

A preferred embodiment of the present invention representing the best mode presently contemplated of carrying out the invention is illustrated in the accompanying drawings in which:

FIG. 1 is a side elevational view of the apparatus, with the main frame of the apparatus in its lowered position and showing a bale of hay in phantom as it would be carried by the apparatus;

FIG. 3 is a side elevational view of the apparatus, with the main frame of the apparatus in its upwardly extending position and showing a bale of hay in phantom ready to be picked up by the apparatus;

FIG. 4 is a partial end elevational view taken on line 4—4 of FIG. 3;

FIG. 5 is a transverse sectional view taken on line 5—5 of FIG. 1;

FIG. 6 is a fragmentary section taken on line 6—6 of FIG. 2;

FIG. 7 is a fragmentary section taken on line 7—7 of FIG. 6;

DETAILED DESCRIPTION OF THE ILLUSTRATED EMBODIMENT

Figure 2:
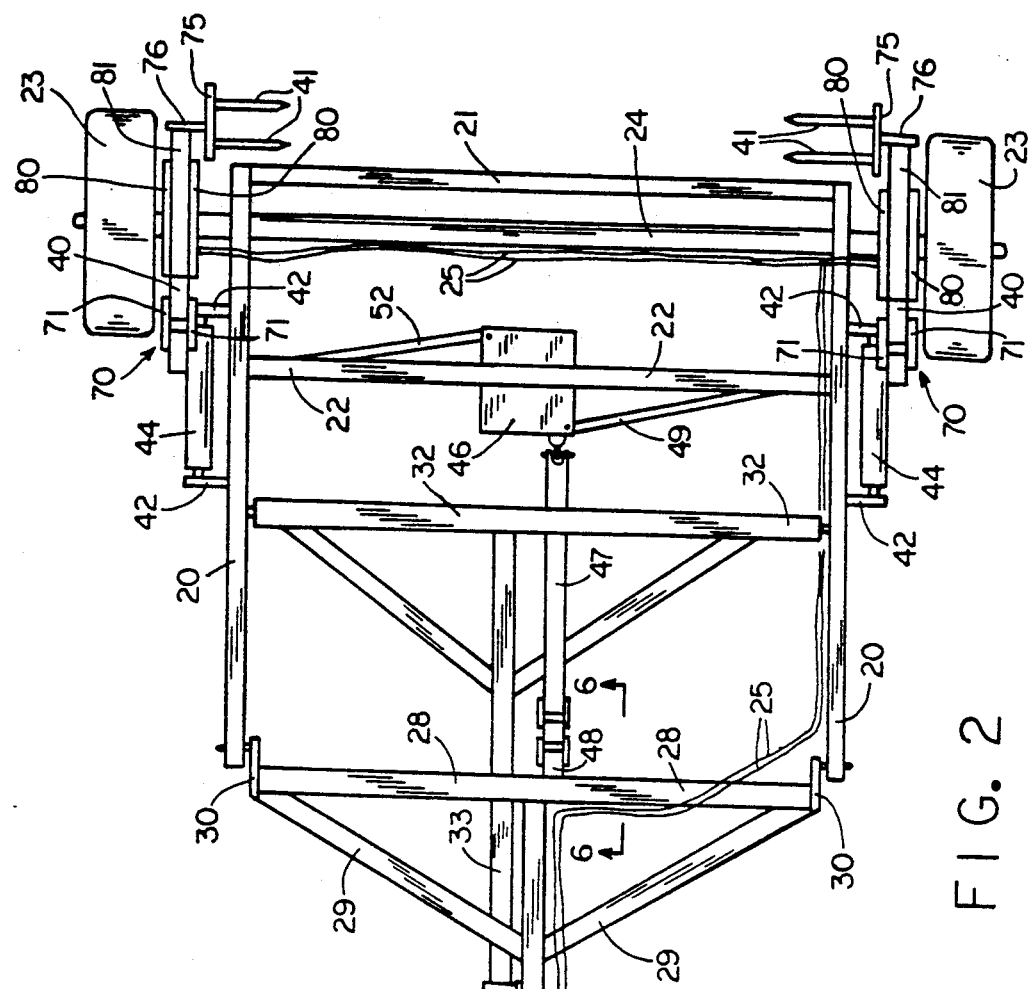
FIG. 2 is a top plan view of the apparatus of FIG. 1.

Referring to the drawings, the apparatus of the invention is shown as an agricultural vehicle for carrying and transporting large bales of hay. The vehicle comprises a main frame formed by parallel side members 20, a rear end member 21, and a cross member 22 extending between the side members 20. The rear end member 21 is attached at the trailing ends of the side members 20, respectively, and the cross member 22 is positioned intermediate the forward ends of the side members 20 and the rear end member 21. As illustrated, the cross member 22 is preferably located somewhat closer to the rear end member 21 than the front of the main frame or forward ends of the side members 20. The main frame is supported on a pair of wheels 23 mounted on an axle 24 which is parallel to and positioned adjacent to the rear end member 21. The axle 24 forms a pivot axis transverse to the main frame and about which the main frame can rotate as will be described hereinafter.

Braking means are provided for braking the wheels 23 relative to the main frame. As illustrated, the braking means comprise conventional electric brakes housed within the wheels 23, with the electric brakes having electrical wires 25 (FIG. 2) extending from the wheels 23 to a connection on the towing vehicle 26, so that the brakes can be operated from the towing vehicle 26.

A hitch frame has one end thereof pivotally connected to the front end portion of the main frame. As illustrated, the hitch frame comprises an elongate tongue member 27 having one end adapted for attachment to the towing vehicle 26. A transverse beam 28 is attached to the rear end of the tongue member 27 and forms the trailing end of the hitch frame. A pair of strut members 29 are attached from the ends of the beam 28 to the tongue member 27 intermediate its ends. The ends of the beam 28 are also attached to plate members 30 which are in turn pivotally connected to the mutually respective front ends of the side members 20 of the main frame.

The main frame and hitch frame are adapted to lie in a somewhat horizontal position when the apparatus is supporting and transporting a bale of hay. Such a position is shown in FIG. 1. In the support and transport position, the main frame and hitch frame are held securely in position with respect to each other by a support and guide member shown generally by the numeral 31. As shown in FIG. 1, the ends of the main frame and hitch frame which are pivotally attached together are somewhat elevated with respect to the other ends thereof. The support and guide member 31 comprises a cross member 32 pivotally attached at its opposite ends to the respective side members 20 of the main frame. The member 31 is spaced between the end of the main frame which is connected to the hitch frame and the cross member 22 of the main frame. An elongate slide member 33 is mounted at its one end to the cross member 32 somewhere intermediated the ends of the cross member 32. The slide member 33 extends forwardly in proximity to the tongue member 27 of the hitch frame. The slide member 33 is adapted to slide longitudinally through a sleeve member 34 which is in turn pivotally attached to the tongue member 27. As best shown in FIG. 5, the sleeve member 34 is attached to a side plate 35, and the side plate 35 is pivotally mounted to tongue member 27 by pivot bolt 36. The slide member 33 slides coaxially within the sleeve member 34. A solenoid activated pin 37 is mounted to the side plate 35 and is adapted to extend through aligned openings in the slide member 33 and sleeve 34 when the apparatus is in its support and transport position as shown in FIG. 1. The pin 37 locks the sleeve 34 and slide member 33 together and this in turn locks the main frame and hitch frame together as a unit.

The main frame is adapted to be moved to a substantially vertical position as shown in FIG. 3. In moving the main frame to its vertical position from its transport position shown in FIG. 1, the solenoid 38 is activated through electrical wires 39 from the towing vehicle 26, and the pin 37 is withdrawn from the openings in the sleeve member 34 and slide member 33. The electric brakes on the wheels 23 are activated from the towing vehicle 26 via the control wires 25, and the towing vehicle is backed up. The main frame then rotates about the pivot axis through axle 24 to its upright position as shown in FIG. 3. With the wheels braked, the main frame can be again lowered to its down position by moving the towing vehicle 26 ahead. As the main frame is rotated upwardly, the slide member 33 slides forwardly through the sleeve member 34 to a position shown in FIG. 3. Another opening can be provided on the slide member 33 for receiving the pin 37 when the main frame is in the upright position. This would lock the main frame in the upright position. With the main frame locked in its upright position, the brakes on the wheels 23 can be released and the apparatus can be moved into desired location with the main frame in its vertical position. Then in lowering the main frame, the solenoid 38 would be activated to withdraw the pin 37 from the opening in the slide member 33.

The upward and downward movement of the main frame is used in loading a bale of material as will now be explained. A pair of bale or load engaging and clamping swing arms 40 are pivotally attached to the parallel side members 20, respectively. The swing arms 40 are adapted to pivot about an axis substantially parallel to the corresponding side members 20. The swing arms are mounted so as to extend rearwardly from the main frame when the main frame is in its vertical position. Means are provided for moving the free ends of the swing arms 40 away from each other when the main frame is rotated to its upwardly standing, vertical position, and, conversely, for moving the free ends of the swing arms 40 toward each other as the main frame moves back downwardly. At least one spike 41 is coupled to the free ends of the swing arms 40. The spikes 41 are directed inwardly towards each other and adapted to stick into a bale of hay which is to be loaded and transported. In operation, the main frame is moved into its upright vertical position, and the apparatus is positioned with the bale of material shown by dashed lines in FIG. 3 between the swing axis 40. The main frame is then lowered and the swing arms simultaneously move inwardly toward each other to engage the bale of hay. As the main frame continues to move downwardly, the ends of the swing arms 40 which have engaged the bale of hay pivot upwardly to pick the bale of hay up. As the main frame moves to its lowered position, the bale of hay is supported as shown by dashed lines in FIG. 1.

Figure 8:
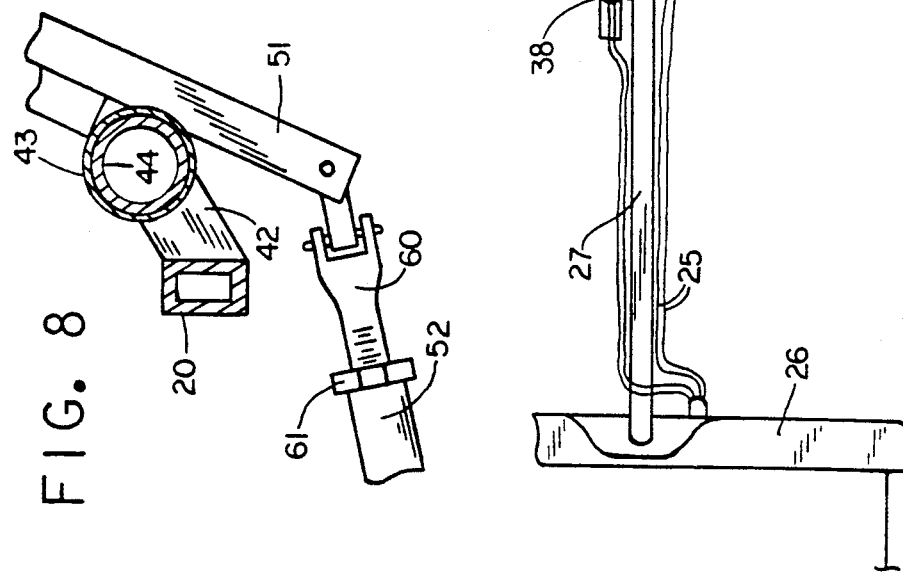
FIG. 8 is a fragmentary section taken on line 8—8 of FIG. 4.

The swing arms 40 are pivotally attached to the side members 20 by a coaxial conduit system or a heavy duty hinge of the piano hinge type. As illustrated in FIG. 8, an inner conduit 44 is attached by brackets 42 at its opposite ends, with the brackets 42 extending from the side members 20 as shown in FIGS. 1–4. An outer conduit 43 is positioned coaxially about the inner conduit 44. The outer conduit 43 is adapted to rotate about the inner conduit 44. Mutually respective ends of the swing arms 40 are attached to the lower ends of the outer conduits 43.

The means for pivotally moving the swing arms 40 comprises a pivot block 46 attached to the mid-section of the cross member 22 of the main frame. The pivot block 46 is adapted for pivotal movement about an axis through its central portion and normal to the plane of the main frame. One corner of the pivot block 46 is attached to one end of an elongate push-pull member 47. The other end of the push-pull member 47 is attached to an extension 48 extending slightly from the transverse beam 28 of the hitch frame. This extension 48 extends from the transverse beam 28 in a direction opposite to the tongue member 27.

A second elongate push-pull member 49 is pivotally connected at one end thereof to the same corner of the pivot block 46 as the one end of the first push-pull member 47. The other end of the second push-pull member 49 is pivotally attached to a short extension 50 of one of the swing arms 40. The short extension 50 extends from the outer conduit 43 directly opposite from the respective swing arm 40 so that when the end of the extension 50 is pushed outwardly from the central portion of the main frame, the spiked end of the swing arm 40 swings inwardly toward the central longitudinal axis of the main frame. A third elongate push-pull member 52 is pivotally connected at one end thereof to the corner of the pivot block 46 which is on the diagonal through the pivot block 46 from the corner to which the first and second push-pull members 47 and 49 are attached. The other end of the third push-pull member 52 is pivotally attached to a short extension 51 of one of the swing arms 40. The short extension 51 is similar to its counterpart member 50 explained above.

When the main frame is in its lowered position as shown in FIGS. 1 and 2, the first push-pull member 47 pushes in a direction toward the back of them and causes the pivot block 46 to rotate on its axis so that the second and third push-pull members 49 and 52 push outwardly from the main frame, thus causing the spiked ends of the swing arms 40 to move inwardly in their bale engagement positions. When the main frame is pivoted upwardly to its upstanding position as shown in FIGS. 3 and 4, the first push-pull member 47 is pulled upwardly away from the pivot block 46 and causes the pivot block to rotate about ¼ turn on its axis so that the second and third push-pull members 49 and 52 pull inwardly, thus causing the spiked ends of the swing arms 40 to move outwardly to release a bale or to be positioned about a bale for subsequently picking the bale up.

The pivot block 46 and push-pull members 47, 49, and 52 are particularly advantageous means for pivotally moving the swing arms 40. When the device has been positioned with the main frame in its upward orientation and the swing arms about the opposite ends of the bale of hay, the wheels 23 are braked and the towing vehicle 26 moves forward to start the main frame in its pivotal downward movement. During the initial downward movement, the rotation of the pivot block 46 pushes the push-pull members 49 and 52 outwardly at a more rapid pace than during the latter portion of the downward movement of the main frame. Thus, the spiked ends of the swing arms rapidly come into contact with and engage the opposite ends of the bale of hay during the initial portion of the downward movement of the main frame. As the main frame then further moves downwardly, the swing arms move upwardly as well as inwardly to pick the bale of hay up into a position shown by the dashed lines in FIG. 1.

Other means could be substituted for the pivot block 46. For example, a sleeve could be positioned about the first push-pull member 47 intermediate its ends so that the member 47 could slide back and forth within the sleeve. The push-pull members 49 and 52 would have mutually corresponding ends pivotally attached to the end of the push-pull member 47. Such a means for pivotally moving the swing arms would, however, produce a uniform steady rate movement of the swing arms as the main frame pivots from its upstanding position to its lowered position. As mentioned above, it is advantageous to have the swing arms 40 pivot inwardly more rapidly during the initial downward movement of the main frame so as to quickly engage the bale of hay which is to be picked up.

The push-pull member 47 is pivotally attached at its opposite ends to the pivot block 46 and the extension 48 by a double pivotal connection such as the universal joint or connection used in the drive shafts of automobiles or the connecting means shown in FIGS. 6 and 7. The pivotal connecting means of FIGS. 6 and 7 comprises a pair of spaced plates 54 which are attached to and extend from the extension member 48. A short block 55 is positioned between the plates 54 and pivotally attached to a pivot pin 56 extending from one plate 54 to the other. The end of the push-pull member 47 has brackets 57 extending therefrom which are positioned around the other end of the block 55. A pivot pin 58 extends through the block 55 from one bracket 57 to the other, with the pivot pin 58 being in a perpendicular plane to the plane of pin 56. The other end of the push-pull member is attached to the pivot block in a similar manner, and the push-pull members 49 and 52 are attached to the pivot block 46 and respective extensions of the swing arms 40 using the same type double pivoting connections.

In the preferred embodiment, means are provided for adjusting the lengths of the push-pull members 47, 49, and 52. As illustrated in FIGS. 6 and 8, one or both of the ends of the push-pull members can comprise a threaded end piece 60 which is threaded into internal threads in the end of the push-pull members. A lock nut 61 is provided for securing the end piece 60 in fixed position. Adjustment is made by loosening the lock nut 61 and then either threading the end piece 60 into the push-pull members or unthreading the end piece 60. When the correct adjustment is achieved, the lock nut 61 is again tightened against the end of the push-pull members to prevent unwanted threading or unthreading of the end member 60.

The tongue member 27 is advantageously attached to the towing vehicle 26 by a conventional ball and hitch, which allows the tongue member to pivot upwardly from the ball member as shown in FIG. 3 when the main frame is moved into its upstanding position.

The detailed description of the apparatus given to this point is a substantial description of the apparatus of my U.S. Pat. No. 4,297,065. In accordance with the present invention, an improvement is provided in such apparatus which allows the swing arms 40 to recline backwardly and downwardly so as to rest the bale of hay on the ground when the apparatus is being moved forward with the main frame in its lowered position. As will be explained further hereinafter, the bale of hay is held so as to be free to rotate about its cylindrical axis, and when the apparatus moves forward, the bale of hay rotates against the ground and unrolls leaving a long strip of hay trailing along the ground for feeding animals.

The improvement of the present invention comprises a joint 70 in each of the swing arms 40. As shown in the drawings, the joint 70 comprises a pair of parallel plates 71 positioned on each side of the swing arms 40 adjacent to the pivotal attachment of the swing arms to the main frame. The swing arms 40 are severed into two distinct portions which are held together by the plates 71 of joint 70. The portions of the swing arms 40 coming from the main frame are rigidly attached as by welding to the plates 71. The extending portions of the swing arms 40 are pivotally attached to the plates 71 by pivot pins 72. The pivot pins 72 are located adjacent to the extending portion of the plates 71, and a short section of each of the swing arms 40 project inwardly between the plates 71 to swing between the plates 71.

Means are provided for locking the joints in a rigid condition with the swing arms 40 extending outwardly in a bale lifting position from the main frame. As shown in the drawings, a locking pin 73 extends over the top side edge of the ends of the swing arms 40 that extend between the plates 71. The ends of the swing arms 40 abut the pins 73 and downward pivotal movement of the swing arms 40 is prevented. The swing arms 40 are instead locked into their bale lifting position extending outwardly from the main frame as best shown in FIGS. 1 and 3.

Means are further provided for releasing the joints 70 in each of the swing arms 40 so that the free ends of said swing arms can move to a reclining, bale resting position in which the swing arms 40 extend backwardly from the trailing end of the main frame when the main frame is in its downward position. In the illustrated embodiment, the pin 73 can be removed to allow the extending portions of the swing arms 40 to move to their reclining position as shown in FIG. 10.

Figure 10:
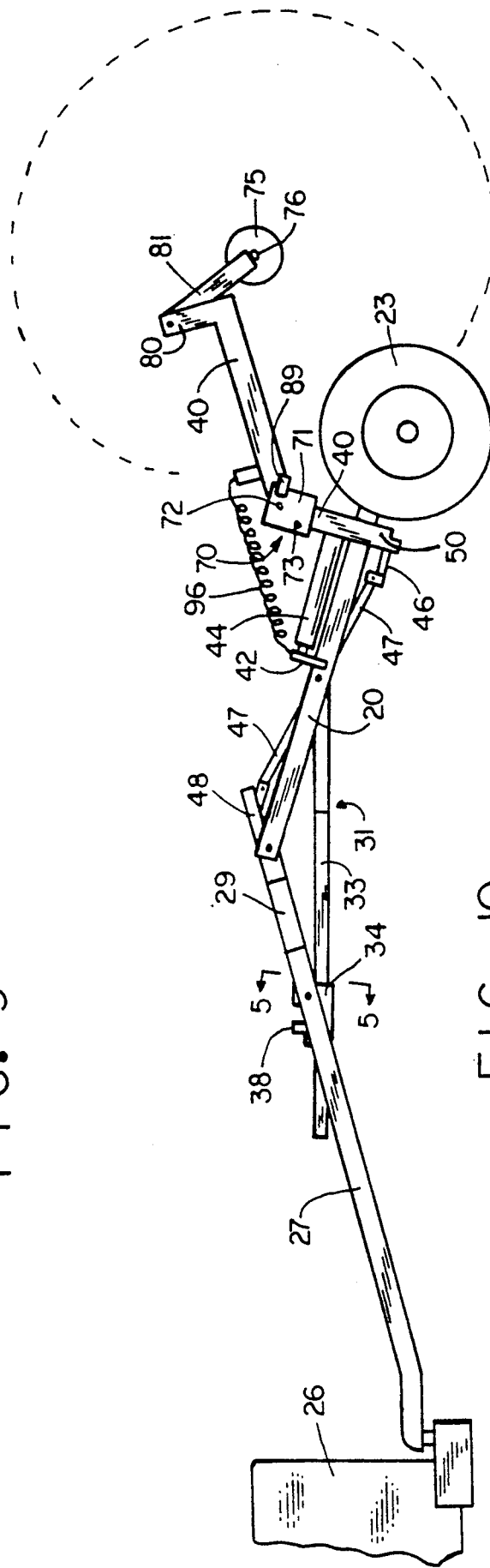
FIG. 10 is a side elevational view similar to that of FIG. 1 but showing the joints in the swing arms released so that the swing arms recline to allow the bale of hay to rest on the ground as the apparatus is being moved forward in the bale unrolling operation.

When the bale of hay has been moved to the position shown in dashed lines in FIG. 10, it can be unrolled by simply moving the apparatus forward. The bale engagement means must, of course, allow the bale of hay to be rotated about an axis extending between the engagement means as the bale of hay is being unrolled. A single spike extending into the bale of hay from the free ends of the swing arms 40 would allow the bale to rotate. It is preferable, however, to provide bale engagement means comprising engagement discs 75 at the ends of the respective swing arms 40, with the discs 75 being coupled to the free ends of the swing arms 40 through pivot axles 76. This allows the bale engagement members, i.e., the engagement discs 75, and the bale of hay to both rotate about the axles 76 which form a pivot axis extending between the engagement means or discs 75. The engagement discs 75 can have one or more spikes 41 which pierce the opposite ends of the bale of hay.

As can be seen from the description given herein and the accompanying drawings, a bale can be picked up for transportation when the joints 70 in each of the swing arms 40 are maintained in a rigid position, and the bale can be rested on the ground to be unrolled when the joints 70 in each of the swings arms 40 are released. As illustrated, it is advantageous to pivotally couple the bale engagement means, i.e., the engagement discs 75, to the free ends of the swing arms 40 through a pair of offset coupling members 80 which are attached to the respective ends of the swing arms and extend upwardly from the ends of the swing arms when the swing arms are in their reclined positions. Extension arms 81 are pivotally attached at respective one ends thereof to the extending portions of the offset coupling members 80, such that the extension arms 81 generally are oriented substantially transverse of the ends of the swing arms 40 but can swing outwardly and upwardly away from the trailing end of the swing arms when a bale is being rested on the ground with the swing arms in their reclined positions as shown in FIG. 10. The bale engagement means are, of course, pivotally attached to the ends of the extension arms 81. The offset coupling members 80 and the extension arms 81 cooperate to give the swing arms 40 a knee action type capability in lowering the bale of hay into contact with the ground and in maintaining the contact with the ground as the size of the bale becomes smaller as it unrolls.

In preparing to unroll a bale of hay, the apparatus must be backed up to the bale as if it were going to lift the bale in the lifting operation as explained previously, or if the apparatus has already lifted the bale, the bale must be set down on the ground with the swing arms 40 extending outwardly from the bale, i.e., with the main frame in its upward position. The locking pins 73 are removed from the joints 70 in the swing arms 40. To prevent the extending portions of the swing arms 40 from dropping to the ground when the pins 73 are removed from the joints 70, it is advantageous to provide a spring loaded catch 89 on each joint 70 to temporarily hold the respective swing arm 40 in a proper position to engage the bale as the apparatus begins to move forward, but will automatically release under the load of the bale of hay so that the swing arms 40 will move under the load of the bale of hay to their reclined positions shown in FIG. 10.

Figure 9:
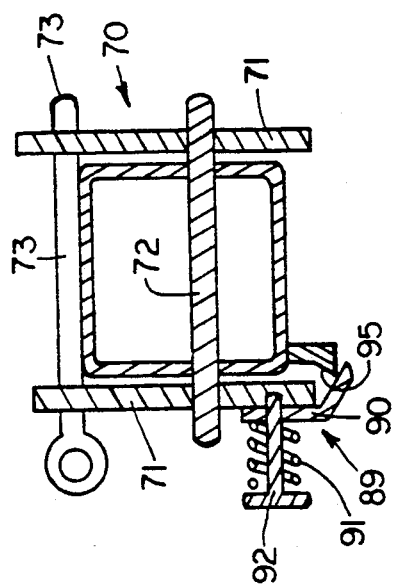
FIG. 9 is a fragmentary section taken on line 9—9 of FIG. 1.

As best illustrated in FIG. 9, the spring activated catch 89 comprises an angled catch piece 90 which is mounted by a spring 91 and mounting stud 92 to the side of one of the plates 71 of the joint 70. The catch 90 can move against the spring away from the joint 70 under sufficient downward load on the swing arm 40, such as when the swing arms are brought into engagement with a bale, with the locking pin 73 removed from the joint 70.

Following unrolling of the bale of hay so that there is no load on the swing arms 40, the swing arms can be moved back into their locked positions. The catch 90 is moved outwardly by a cam surface 95 on the swing arm 40 and then snaps back to engage the lower edge of the cam surface. In this position, the locking pin 73 is easily engaged in the joint 70 to lock the swing arm in place.

It is also advantageous to provide additional spring biasing means for biasing the swing arms 40 toward their bale lifting positions. As illustrated, elongate coil springs 96 can be attached between the swing arms 40 and the main frame, such a via the top bracket 42 of the means for pivotal attachment of the swing arms to the main frame. The coil springs 96 assist the spring mounted catch 90 in temporarily holding the swing arms 40 in their bale engaging extensions until engagement with a bale has been achieved. However, when the locking pins 73 have been removed from the joints 70 and once the bale has been engaged as the main frame moves downwardly, the load on the swing arms 40 overcomes the spring biased catch 90 and the coil spring 96 to move to the bale unrolling position of FIG. 10. The coil spring 96 is of assistance in moving the swing arms 40 back to their bale lifting positions once the bale has been unrolled and the load has been removed from the swing arms.

Although preferred embodiments of the apparatus of the present invention have been illustrated and described, it is to be understood that the present disclosure is made by way of example and that various other embodiments are possible without departing from the subject matter coming within the scope of the following claims.

I claim:

1. An improvement in apparatus for picking up and transporting a large bale of material, such as a bale of hay, in which the apparatus is of the type comprising a main frame supported by wheel means having a pivot axis transverse of the main frame adjacent to the rear end portion of the main frame; braking means for braking the wheel relative to the main frame; a hitch frame having one end pivotally connected to the front end portion of the main frame, with the other end of the hitch frame adapted to be connected to a tow vehicle, so that when the braking means are activated and the tow vehicle is backed up, the front end portion of the main frame swings upwardly, and when the braking means are activated and the tow vehicle moves forward, the front end portion of the main frame swings back downwardly; a pair of bale engaging and clamping swing arms pivotally attached to the respective sides of the main frame, each swing arm being adapted to pivot about an axis substantially parallel to the corresponding side of the main frame to which it is attached; and means associated with the main frame and hitch frame for pivotally moving the outward ends of the swing arms away from each other when the forward end of the main frame is swung upwardly and, conversely, for pivotally moving the outward ends of the swing arms toward each other when the forward end of the main frame moves back downwardly, said improvement comprising a joint in each of said swing arms;

means for locking the joints in each of the swing arms in a rigid condition with the swing arms extending outwardly in a bale lifting position from said main frame;

means for releasing the joints in each of the swing arms so that the free ends of said swing arms can move to a reclining, bale resting position in which the swing arms extend backwardly from the trailing end of the main frame when the main frame is in its downward position;

bale engagement means that allow the bale to be rotated about an axis extending between the engagement means;

a pair of offset coupling members having first and second ends, with the first ends of the coupling members being attached to the respective ends of the swing arms such that the second ends of the coupling members extend upwardly from the ends of the swing arms when the swing arms are in their reclined positions;

a pair of extension arms having first and second ends, with the first ends of the extension arms being pivotally attached to respective second ends of said offset coupling members, such that the extension arms generally are oriented substantially transverse of the ends of said swing arms but can swing outwardly and upwardly away from the trailing end of the swing arms when a bale is being rested on the ground with the swing arms in their reclined positions; and the bale engagement means are pivotally attached to the ends of said extension arms, whereby a bale can be picked up for transportation when the joints in each of the swing arms are maintained in a rigid position, and the bale can be rested on the ground to be unrolled when the joints in each of the swings arms are released.

2. An improved apparatus in accordance with claim 1, wherein the means for coupling said bale engagement means to the free ends of said swing arms allows the bale engagement means and the bale to rotate about an axis extending between the engagement means.

3. An improved apparatus in accordance with claim 1, wherein a spring activated catch is provided on the joint in each of the swing arms to temporarily hold the respective swing arm in a proper position for the bale engagement means to engage a bale after the joints have been released, but will release under the load of a bale so that the swing arms will move under the load of the bale to their reclined positions.

4. An improved apparatus in accordance with claim 1 further including spring biasing means for biasing the swing arms toward their bale lifting positions.

* * * * *